Jan. 4, 1966     D. H. MISEGADIS     3,227,393
VEHICULAR WIRE WINDER
Filed Aug. 24, 1962     2 Sheets-Sheet 1
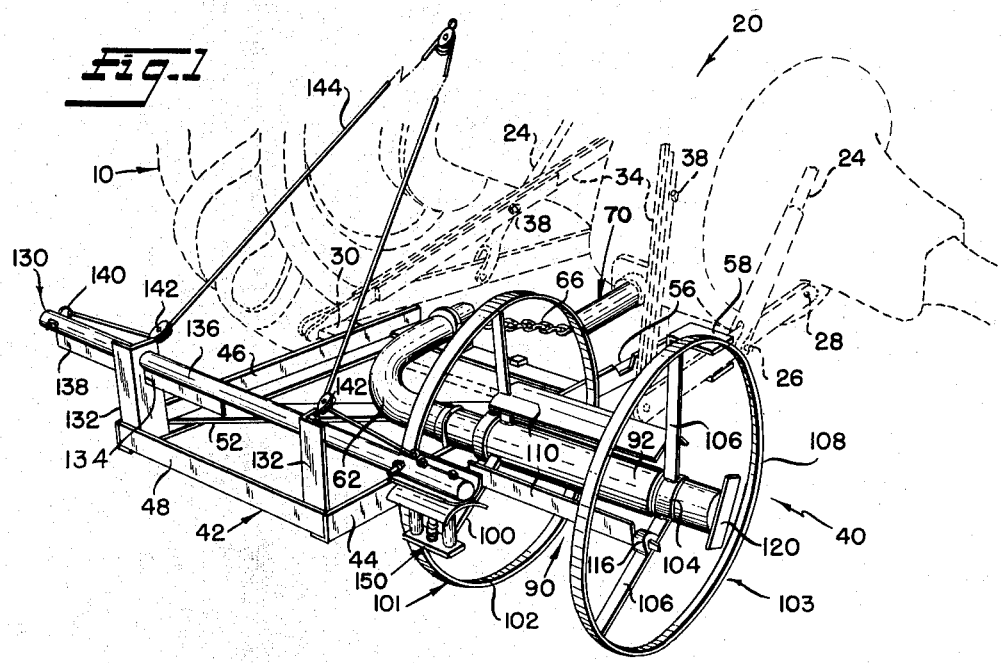
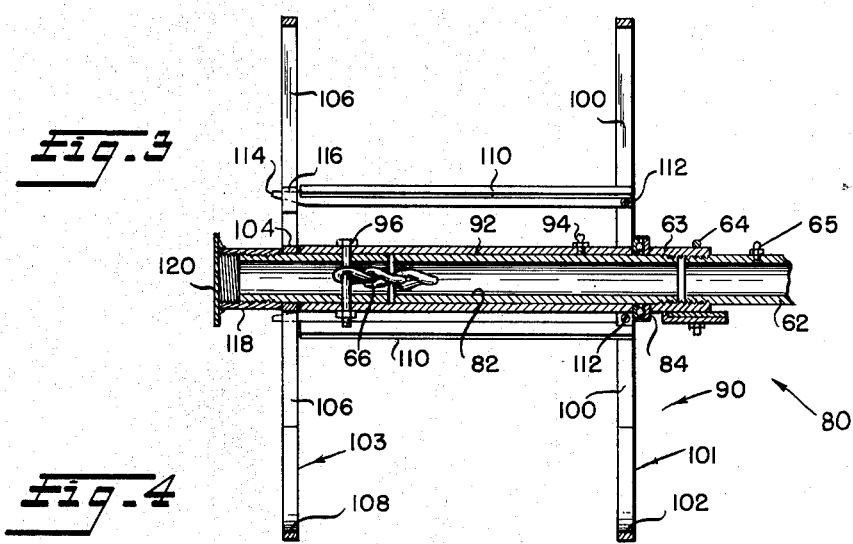
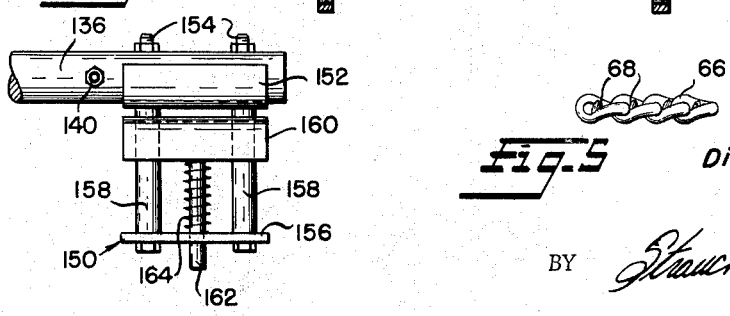
INVENTOR
Dietrich H. Misegadis
BY *Strauch, Nolan & Neale*
ATTORNEYS INVENTOR
Dietrich H. Misegadis

ATTORNEYS

United States Patent Office 3,227,393
Patented Jan. 4, 1966

3,227,393
VEHICULAR WIRE WINDER
Dietrich H. Misegadis, Rush Center, Kans.
Filed Aug. 24, 1962, Ser. No. 219,304
5 Claims. (Cl. 242—86.5)

This invention pertains to farm equipment, specifically equipment to be mounted on a farm vehicle or tractor for winding fence wire and the like into coils or for unwinding and laying fence wire from coils.

A vehicular wire winder that has a wire reel with a horizontal axis of rotation transverse to the direction of vehicular motion is shown in United States Letters Patent No. 2,839,257 to Chicane. The Chicane device is designed to wind wire as the tractor is driven over a wire strand lying on the ground. This technique of wire winding requires a low torque, variable speed drive for the reel as explained in that patent. However, if wire is wound by another known technique wherein a stationary winding device pulls a strand of wire across the ground, then a high torque power drive is required. Such drives are normally rotationally rigid shaft arrangements sometimes incorporating universal joints to accommodate misalignment between the tractor power takeoff shaft and the rotational axis of the winding reel as seen in United States Letters Patent No. 2,828,089 to Isenberger. Other rigid shaft drives incorporate resilient drive means to maintain tension during winding as seen in United States Letters Patent No. 2,823,873 to Peterson.

To more readily accomplish some of the above ends in the present invention, a novel, high torque, inherently resilient, flexible power drive device is utilized. The use of the device of this invention eliminates the need for universal joints, special resilient drive means, and bevel gearing in the power drive of a vehicular wire winder.

Accordingly, the primary object of this invention is to provide an improved vehicular wire winder adapted to be rotated by a torsionally resilient drive-chain connected to a power takeoff shaft of the vehicle.

Another object is to provide an improved vehicular wire winder adapted to be operated from a longitudinal power takeoff shaft of the vehicle by a torsion drive-chain that is rotatably contained in an arcuate tubular chain guide which extends through substantially a right angle so that the rotational axis of the wire winder is transverse to said power takeoff shaft. The torsion drive-chain means has sufficient inherent friction to prevent over-running of said spool when laying wire with the vehicle in motion and with power takeoff shaft disengaged, and the spool of the winder is mounted on a horizontal axis clear of the remainder of said winder so that coils of wire may be easily loaded and unloaded from said winder.

A further object of the invention is to provide an improved wire winder for a vehicle having an elevationally adjustable drawbar mechanism wherein the frame of the wire winder may be readily connected to or removed from the existing parts of the mechanism and wherein the wire winder may be operated at various elevational positions relative to said vehicle.

Another object is to provide an improved wire winder for a vehicle wherein wire winding guide means are provided to permit the operator to distribute the winding wire into a uniform coil along the axial length of the spool of the winder from a safe operating position in the seat of the vehicle and wherein the wire guide means is constructed so as to maintain continual tension on the wire while it is being wound.

These and other objects will appear in the following description and appended claims when read in conjunction with the accompanying drawings wherein:

FIGURE 1 is a perspective view showing the wire winder in solid lines mounted upon the draft mechanism of a tractor shown in dotted lines;

FIGURE 3 is a vertical section through the spool assembly of the wire winder taken on line 3—3 of FIGURE 2;

FIGURE 4 is a rear view of the wire guide of the wire winder of FIGURES 1 and 2; and FIGURE 5 is an enlarged view of the drive-chain of the wire winder of FIGURES 1 and 2.

Figure 2:
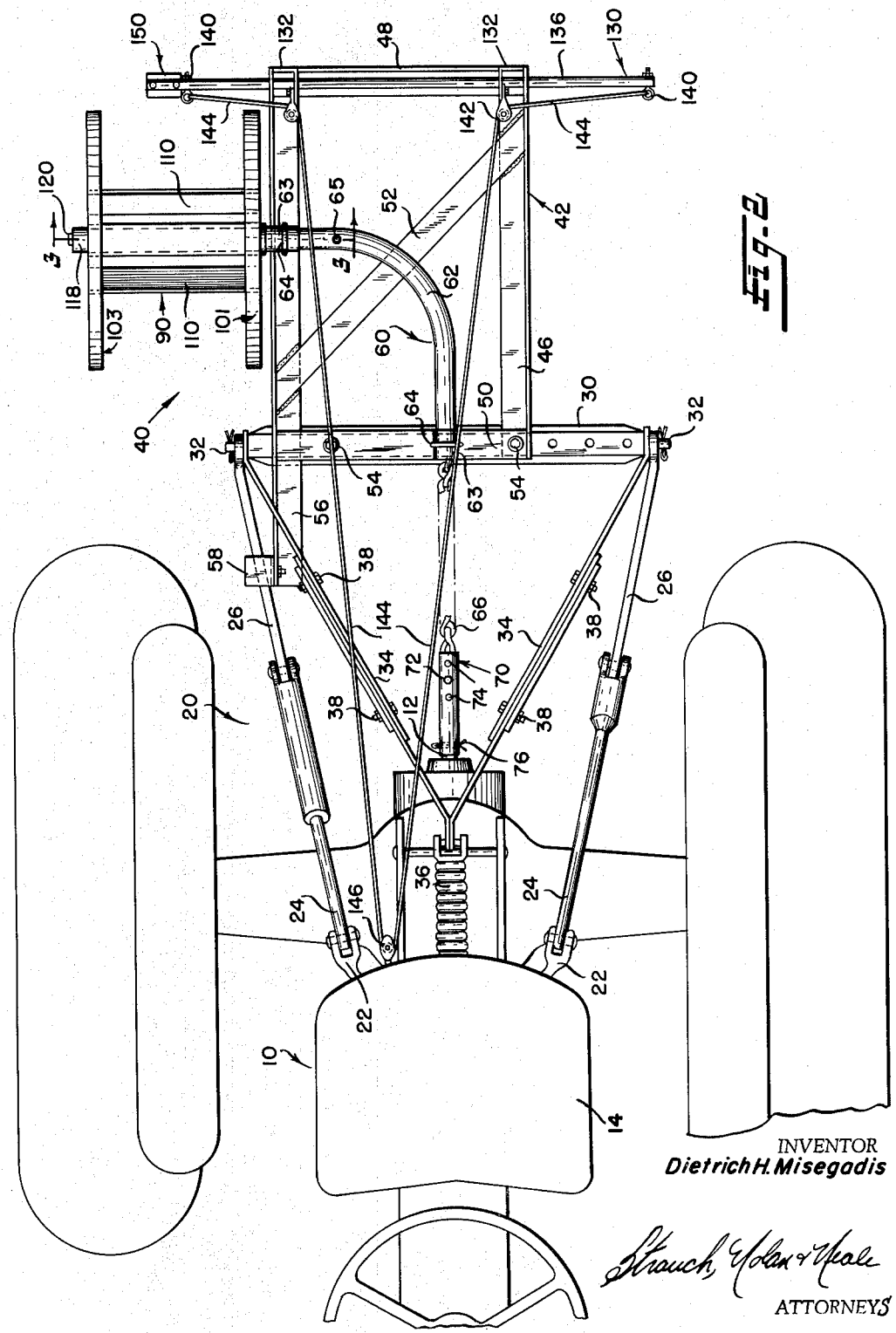
FIGURE 2 is a top view of the wire winder and tractor of FIGURE 1.

As seen in FIGURES 1 and 2, the tractor, shown generally at 10, has a power takeoff shaft 12, an operator's seat 14 and a draft mechanism 20 connected to the rear thereof. The draft mechanism 20 includes crank arms 22 pivotally mounted on a hydraulically operated shaft, not shown, extending through the tractor casing. The rotating outer ends of crank arms 22 are respectively pivotally connected to the upper ends of drop links 24. The lower ends of drop links 24 are respectively pivotally connected to draft or tension links 26 intermediate the length thereof. Draft links 26 are respectively pivotally connected at their forward ends to the casing of the tractor as at points 28. Transverse drawbar 30 is pivotally connected by its integral rod-like ends 32 to the rearward extending ends of draft links 26.

When drawbar 30 has been suitably adjusted in elevational position by means of hydraulically operated crank arms 22, it may be locked in that position by means of telescoping locking links 34 which are also pivotally connected to drawbar 30 at its rod-like ends 32. The forward ends of telescoping links 34 are connected to the tractor casing by means of shock absorbing spring mechanism 36. Telescoping links 34 are provided with clamping bolts 38 which are tightened to fix drawbar 30 in a selected elevational position.

Mounted on the draft mechanism 20 of tractor 10 is the wire winder 40 of the present invention. Wire winder 40 includes frame 42 having a primary longitudinal member 44 supported by the upper surface of transverse drawbar 30 and extending forwardly and rearwardly thereof. Extending parallel to primary longitudinal member 44 is secondary longitudinal member 46 also supported by drawbar 30 but extending only rearwardly thereof. Connected between the rear ends of longitudinal members 44 and 46 is rear cross member 48. At the forward end of secondary longitudinal member 46 and extending parallel to and above drawbar 30 is forward cross member 50. Cross member 50 is rigidly attached to the forward end of secondary longitudinal member 46 and to the intermediate portion of the primary longitudinal member 44 adjacent drawbar 30. It is thus seen that members 44, 46, 48, and 50 form a generally rectangular frame 42. To add rigidity to this rectangle, diagonal member 52 is fixedly connected across frame 42.

Frame 42 is mounted upon the draft mechanism 20 of tractor 10 as by bolts 54 extending through forward cross member 50 and underlying drawbar 30 to secure the two together. To prevent wire winder 40 from pivotally tilting with drawbar 30, primary longitudinal member 44 has a forwardly extending portion 56. At the forward end of portion 56 and rigidly connected thereto is U-shaped bracket or fitting 58. Bracket 58 engages the top and bottom surface of one of the draft links 26 when the wire winder is mounted on the tractor 10.

The torsion drive-chain assembly seen generally at 60 (FIGURE 2) includes tubular, arcuate drive-chain guide 62 rigidly mounted on frame 42 as by means of U-bolts 64 extending through and secured to frame 42. Chain guide 62 may be a round pipe with couplings 63 threadedly engaged on each end and bent to a smooth arc of approximately 90°. Intermediate the ends of drive-chain guide 62, grease fitting 65 may be provided to lubricate the torsion drive-chain. Torsion drive-chain 66 extends through the chain guide 62 and is rotatably contained therein. In the preferred embodiment, drive-chain 66 is a twisted link chain having blocks 68 (FIGURE 5) welded across the center portion of each link. Crossblocks 68 are provided to strengthen chain 66, to limit the shortening of the chain when it is driving the winder, and to permit the chain to transmit reverse torque without kinking. The forward end of drive-chain 66 is attached to a coupling 70 by means of bolt 72 extending through one of a plurality of holes 74 provided in coupling 70. Coupling 70 may be a tubular pipe open at both ends. Coupling 70 slips over power takeoff shaft 12 and is rotatably fixed thereto by means of a cotter pin 76. The outer or rearward end of drive-chain 66 is suitably fixed to the spool of the wire winder as hereinafter explained.

The spool assembly 80 (FIGURE 3) includes tubular spool mounting spindle 82 which forms a coaxial extension of the outer end of arcuate drive-chain guide 62 and is fixed thereto by means of the outer coupling 63. Annular thrust bearing 84 is mounted on spindle 82 and is axially supported by the outer coupling 63. Thrust bearing 84 is provided to axially support the rotating parts of the spool assembly 80 against the axial pull of the drive-chain 66 when it is transmitting torque.

Spool 90 of spool assembly 80 is rotatably mounted on spindle 82 and includes tubular hub 92 having grease fitting 94 to provide suitable lubrication between spindle 82 and the hub 92. At the outer end of hub 92, through bolt 96 extends through hub 92 and the end of drive-chain 66. Coaxial with hub 92 is tubular hub extension 98 slidably fitting within the outer end of hub 92. Hub bolt 96 also passes through hub extension 98 and thus fixes it to hub 92. At the inner end of hub 92, radial spokes 100 are rigidly fixed thereto as by means of welding. Encompassing radial spokes 100 and rigidly fixed to the outer ends thereof is circular rim 102. Radial spokes 100 and rim 102 thus form the innner end 101 of spool 90. The outer end 103 of spool 90 includes ring 104 slidably engaging hub extension 98 and abutting the outer end of hub 92. Radial spokes 106 are rigidly attached to ring 104 and circular rim 108 encompasses the outer ends of radial spokes 106 and is securely affixed thereto as by means of welding.

To form a collapsible core for spool 90 upon which wire may be wound, arcuate core plates 110 are pivotally mounted as at 112 to the inner radial spokes 100. At the outer ends of plates 110, integral tapered extensions 114 slidably engage semi-cylindrical fittings 116 which are rigidly secured to the outer spokes 106 as by means of welding.

To secure the outer end 103 of spool 90 upon hub extension 98, a coupling 118 is provided to threadedly engage hub extension 98 to secure ring 104 against the outer end of hub 92. A strap 120 is affixed to the outer end of coupling 118 as by means of welding and serves as a hand means by which coupling 118 may be screwed on and off the hub exension 98.

To enable the operator of the wire winder to distribute the wire being wound along the axial length of spool 90 so as to wind an even coil of wire, a wire guide assembly 130 (FIGURES 1 and 2) is provided. The wire guide assembly 130 includes upright angle supports 132 rigidly connected to frame 42 of the wire winder. Supports 132 are each provided with key shaped holes 134 (FIGURE 1) to slidably receive wire guide shaft 136 and its orienting plate 138. At the ends of wire guide shaft 136, eye bolts 140 are fixed thereto. Pulleys 142 are mounted on the respective upright supports 132 and engage a guide rope 144 secured at its two ends to the respective eye bolts 140. The guide rope extends through pulleys 142 to a pulley 146 adjacent the operator's seat of the tractor 10.

Secured to one end of wire guide shaft 136 is the wire guide 150 best shown in FIGURE 4. The wire guide 150 includes an arcuate upper guide plate 152 rigidly attached to shaft 136. Bolts 154 extend through shaft 136 and through the upper guide plate 152 to draw cross plate 156 against the lower ends of guide tubes 158 which enclose bolts 154. Slidably mounted on guide tubes 158 is an arcuate lower guide plate 160 having depending rod 162 rigidly affixed thereto. The rod 162 slidably extends through an opening in the cross plate 156. A compression coil spring 164 is coaxially mounted on rod 162 between the cross plate 156 and the lower guide plate 160 to bias lower guide plate 160 toward upper guide plate 152 to maintain a predetermined frictional resistance on a wire passing therebetween.

To operate the wire winder, the drawbar 30 is first adjusted to any elevational position so as to place the wire winder at a convenient height and is then fixed in that position by means of locking links 34. The forward end of drive-chain guide 62 and the power takeoff shaft 12 of the tractor need not be aligned in this selected position since the torsion drive-chain 66 and the links thereof will act as universal joints to correct for this misalignment.

The frame of the winder 42 is then mounted on transverse drawbar 30 of the tractor by means of bolts 54. The relative position of frame 42 on drawbar 30 is selected so as to assure that the forward extension 56 of the frame lies adjacent to one draft link 26 so that U-shaped bracket 58 will engage that link. The coupling 70 of the wire winder is attached to the power takeoff shaft 12 of the tractor 10. The bolt 72 connecting coupling 70 to drive-chain 66 is selectively engaged with the proper bolt hole 74 in coupling 70 so as to ensure that chain 66 will be taut when transmitting torque.

When the wire winder 40 is mounted on the tractor, the tractor is maneuvered into position so that the longitudinal axis of the tractor is parallel with a rearwardly extending strand of wire to be wound. One end of the strand of wire is led through the spring biased guide plates of the wire guide 150. The end of the wire is then fixed or tied to a part of the spool 90. The power takeoff shaft 12 of the tractor is then engaged to the rotating power source of the tractor which causes torsion drive-chain 66 to transmit this rotary motion to the spool 90. Because of the inherent characteristics of drive-chain 66, a constant rotational speed of the power takeoff shaft of the tractor will be resiliently transmitted to permit slight variations in rotational speeds of the spool. Thus, a more constant winding tension is maintained on the wire which may catch and jerk occasionally during winding.

As the wire is being wound, it is distributed between inner end 101 and outer end 103 of the spool under the manual supervision of the tractor operator by means of guide rope 144 which, when moved through pulley 146, will slide the wire guide shaft 136 back and forth between the extreme limits as determined by the position of eye bolts 140 on shaft 136.

When a strand of wire has been wound into a coil on spool 90, it may be tied by means of light wire or twine placed around the coil through the open spaces in the spool between the core plates 110. When the coil is thus secured, coupling 118 may be unscrewed from the hub extension 98 of the spool by means of strap 120. Upon removal of coupling 118, the outer end 103 of the spool may be removed. The extensions 114 of the core plates 110 are then free and the plates 110 may be pivoted toward hub 92 about points 112 to collapse the center of the spool. The tied coil of wire may then be readily removed from the spool 90. The spool is then reassembled with extensions 114 of core plates 110 in semi-cylindrical fittings 116 on the spokes 106 of the outer end of the spool.

To utilize the wire winder 40 to unwind wire from a coil and lay it in a strand upon the ground, the outer removable end 103 of the spool is removed as described above. The coil of wire to be layed is then placed on the spool. In replacing the outer end 103 of the spool it is unnecessary to engage extensions 114 of core plates 110 in the fittings 116. The wire or twine securing the coil is then cut and the free end of the coiled wire is secured to a fence post or the like. In an unwinding operation, the wire is not led through the guide 150. The tractor is driven away from the fence post on a line along which the wire is to be layed. The power takeoff shaft of the tractor at this time is disengaged but the unwinding wire upon the spool rotates drive-chain 66 and the power takeoff shaft 12. Crossblocks 68 prevent drive-chain 66 from kinking during this "reverse torque" operation. The torsion drive-chain 66 has sufficient friction inherent in its rotational relationship with chain guide 62 to provide a braking effect on spool 90 during unwinding. This frictional braking effect prevents spool 90 from over-running during unwinding and assists in preventing back lashes in the wire.

The invention may be embodied in other specific forms without departing from the spirit or other essential characteristics thereof. The present embodiment is, therefore, to be considered in all respects as illustrative and not restrictive, the scope of the invention being indicated by the appended claims rather than by the foregoing description and all changes which come within the range of equivalency of the claims are, therefore, intended to be embraced therein.

What is claimed and desired to be secured by Letters Patent is:

1. In combination with a vehicle having a power source for driving a longitudinally extending power take-off shaft, a wire winder comprising:
   (a) a rigid frame fixedly mounted in said vehicle,
   (b) open ended tubular guide means fixed to said frame,
   (c) a flexible drive chain axially and rotatably extending through said tubular guide means,
   (d) means for non-rotatably coupling one end of said drive chain to said power take-off shaft, and
   (e) a spool for winding a coil of wire, said spool comprising:
   (f) an open-ended hub rotatably mounted on the end of said guide means with one end of said open-ended hub located adjacent to the other end of said drive chain,
   (g) a cylindrical hub extension partially, slidably received in said one end of said hub,
   (h) means including a rigid member extending transversely through said hub extension and said hub for detachably but non-rotatably and axially fixing said extension to said hub, and
   (i) a rim mounted on said hub extension and being detachable therewith,
   (j) said drive chain extending axially into said hub extension and being secured to said rigid member for rotating said hub and said hub extension.

2. A wire winder for a vehicle having a power takeoff shaft comprising:
   a frame adapted to be mounted on the vehicle;
   a spool for a coil of wire;
   means for mounting said spool for rotation relative to said frame; and
   torsion drive-chain means mounted on said frame and connected at one end to said spool and adapted to be connected at its other end to the power takeoff shaft whereby said spool may be rotatably driven with torsional resiliency to wind wire into a coil on said spool, said torsion drive-chain means comprising an arcuate, tubular drive-chain guide secured to said frame, a twisted link drive-chain rotatably extending through said chain guide, and a coupling connected to one end of said chain and adapted to be connected to the power takeoff shaft of the vehicle, the other end of said chain being connected to said spool whereby said spool may be rotated about an axis at a substantial angle relative to the rotational axis of said coupling; and wherein said means for mounting said spool comprises a tubular spindle rigidly connected to and axially aligned with one end of said arcuate drive-chain guide to rotatably support said spool and a thrust bearing on said spindle axially supported by said drive-chain guide and adapted to axially contact one end of said spool whereby said spool is axially supported by said thrust bearing when said drive-chain tightens as it transmits torque.

3. A wire winder for a vehicle having a power takeoff shaft comprising:
   (a) a frame adapted to be rigidly mounted on the vehicle;
   (b) a spool for a coil of wire;
   (c) means for mounting said spool on said frame for rotation relative thereto;
   (d) torsion drive-chain means mounted on said frame and connected at one end to said spool and adapted to be connected at its other end to the power takeoff shaft whereby said spool may be rotatably driven with torsional resiliency to wind wire into a coil on said spool; and
   (e) wire winding guide means comprising a shaft connected to said frame for reciprocal motion in a path parallel to the axis of spool rotation, a wire guide having a first guide plate rigidly connected to one end of said shaft and a second guide plate mounted on said shaft by spring means to bias it into contact with said first guide plate for frictionally gripping wire therebetween whereby said wire guide may be moved back and forth during winding to distribute wire along the axial length of said spool and whereby said frictionally gripping wire guide assures continual tension during winding to reduce loose winding and backlash.

4. In combination with a vehicle having a power source, a longitudinal power takeoff shaft at the rear thereof selectively engageable with said power source, and draft means at the rear thereof to which said frame is connected, said draft means comprising a transverse drawbar and a pair of substantial longitudinal draft links respectively pivotally connected at one end to each end of said transverse drawbar and at the other end to said vehicle, a wire winder comprising:
   (a) a frame connected to said vehicle draft means, said frame including a cross member securely mounted on said transverse drawbar and a longitudinal member rigidly connected to said cross member, said longitudinal member extending forwardly adjacent the inner side of one of said draft links and terminating in an outwardly opening U-shaped fitting engaging said one draft link whereby said U-shaped fitting fixes said longitudinal member and said frame in substantially fixed relationship to said draft means;
   (b) a spool for a coil of wire;
   (c) means for mounting said spool on said frame for rotation relative thereto;
   (d) and torsion drive-chain means connected at one end to said spool whereby said spool may be rotatably driven with torsional resiliency to wind wire into a coil on said spool.

5. In combination with a vehicle having a power source, a longitudinal power takeoff shaft at the rear thereof selectively engageable with said power source and an operator's seat, a wire winder comprising:
   (a) a frame connected to said vehicle;
   (b) a spool for a coil of wire;
   (c) means for mounting said spool on said frame for rotation relative thereto;

(d) torsion drive-chain means connected at one end to said spool whereby said spool may be rotatably driven with torsional resiliency to wind wire into a coil on said spool; and (e) wire winding guide means comprising a shaft connected to said frame for reciprocal motion in a path parallel to the axis of spool rotation, a wire guide connected to one end of said shaft, a plurality of pulleys connected to said frame and to said vehicle adjacent said operator's seat, and a rope engaging said pulleys, said rope being connected to said shaft and adapted to be manipulated from the operator's seat to permit control of the distribution of wire along the axial length of said spool during a wire winding operation.

References Cited by the Examiner

UNITED STATES PATENTS

| | | | |
|---|---|---|---|
| 325,616 | 9/1885 | Lyons | 242—86.8 |
| 401,681 | 4/1889 | Brown | 64—2.6 |
| 843,213 | 2/1907 | Juve | 242—86.8 |
| 910,014 | 1/1909 | Oliver | 64—2.6 |
| 1,415,689 | 5/1922 | Parent | 64—2.6 X |
| 1,595,922 | 8/1926 | Prindle | 64—2.6 X |
| 2,324,350 | 7/1943 | Baal | 242—86.5 |
| 2,688,454 | 9/1954 | Nicolas | 242—86.5 |
| 2,914,270 | 11/1959 | Parker et al. | 242—86.5 |
| 3,085,543 | 4/1963 | Falkner | 114—235 |

MERVIN STEIN, *Primary Examiner.*

RUSSELL C. MADER, *Examiner.*